May 9, 1961 H. IAMS 2,983,916
THREE COORDINATE INDICATOR SYSTEM
Filed April 5, 1948 2 Sheets-Sheet 1

INVENTOR.
Harley Iams
BY
J. L. Whittaker
ATTORNEY

May 9, 1961   H. IAMS   2,983,916
THREE COORDINATE INDICATOR SYSTEM
Filed April 5, 1948   2 Sheets-Sheet 2

INVENTOR.
Harley Iams
BY J. L. Whittaker
ATTORNEY

United States Patent Office 2,983,916
Patented May 9, 1961

2,983,916

THREE COORDINATE INDICATOR SYSTEM

Harley Iams, Venice, Calif., assignor to Radio Corporation of America, a corporation of Delaware Filed Apr. 5, 1948, Ser. No. 18,941

4 Claims. (Cl. 343—11)

This invention relates to position indicator systems, and more particularly, though not exclusively, to improvements in position indicators as used with radar apparatus to show the positions of objects such as aircraft.

The principal object of this invention is to provide methods of, and means for, indicating visually the positions of objects in three coordinates, such as azimuth, range, and altitude.

More specifically, it is one of the objects of the present invention to provide methods and means for producing a visual display of the PPI (plan position indication) type, wherein the spots or "pips" representing aircraft or the like are in the form of numerals or other distinctive characters indicating the approximate altitudes.

Another object of the invention is to provide a system of the described type wherein objects or targets are represented in azimuth vs. elevation coordinates, by spots characteristically shaped or colored so as to indicate range.

Figure 1:
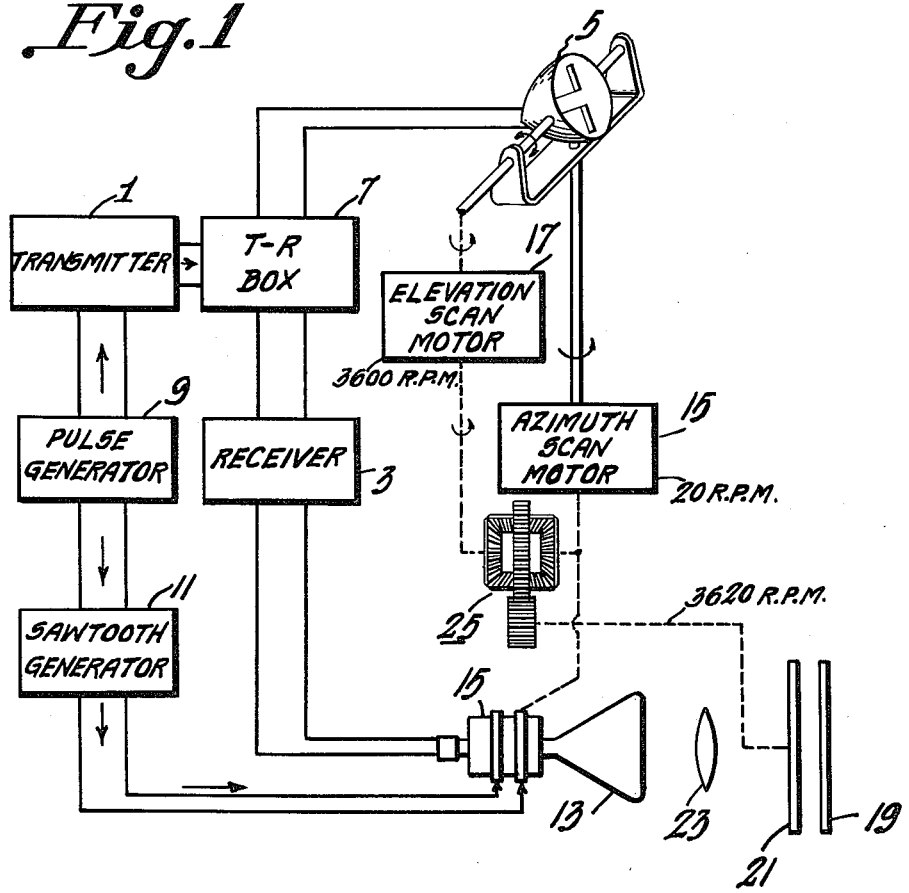
Figure 2:
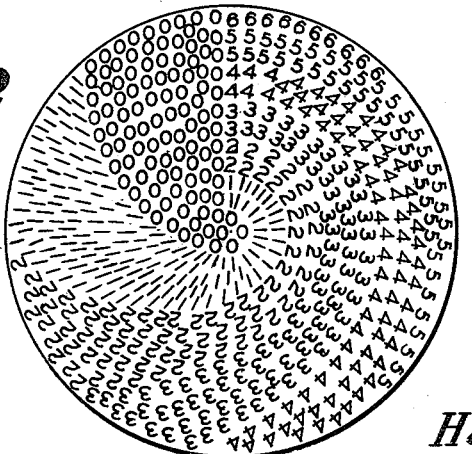
Figure 3:
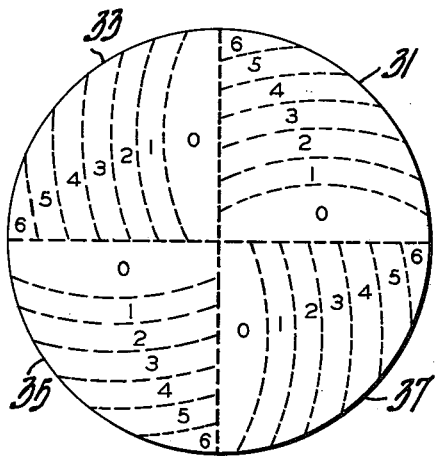
Figure 4:
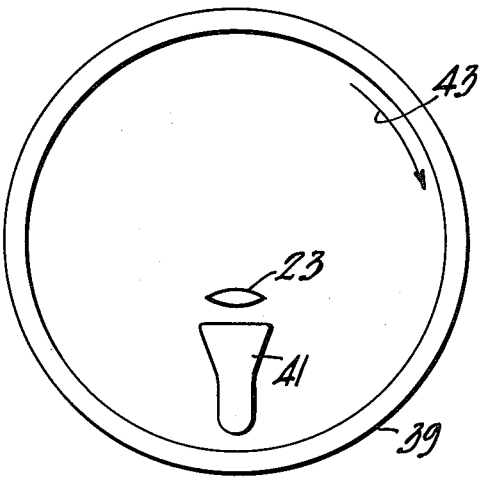
Figure 5:
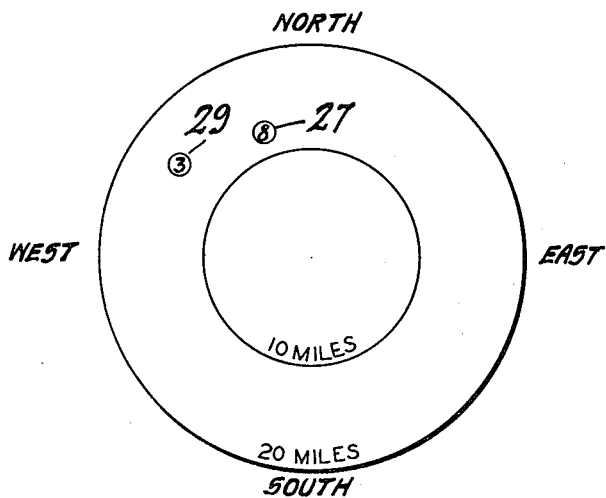

The invention will be described with reference to the accompanying drawings, wherein:

Figure 1 is a schematic block diagram of a radar system embodying a preferred form of the invention, Figure 2 is an elevation of one of the elements of the system of Figure 1, Figure 3 illustrates a modification of the device of Figure 2, Figure 4 is a plan view of a modified type of indicator system, and Figure 5 illustrates the type of indication provided by the system of Figure 1.

The position indicator shown in Figure 1 includes a radar system comprising a pulse transmitter 1, a receiver 3, and a directive antenna 5. A duplexing device 7, of the type commonly known to those skilled in the art as "T-R box," is provided in the connections between the transmitter 1, receiver 3, and the antenna 5. A pulse generator 9 modulates the transmitter 1 and also controls a saw tooth wave generator 11. The output circuit of the receiver 3 is connected to the beam intensity control of a cathode ray oscilloscope tube 13. The tube 13 is provided with a rotatable reflection yoke 15 which is energized by the output of the saw tooth wave generator 11.

The antenna 5 is arranged to provide a relatively sharp pencil-like beam which is moved to scan both in azimuth and in elevation. Azimuth scanning may be provided by means of a motor 15 arranged to rotate the antenna structure about a vertical axis at a speed of, for example, 20 revolutions per minute. Elevation scanning may be provided by a motor 17 arranged to rock the antenna 5 up and down about a horizontal axis at a considerably different rate, for example, 3600 times a minute. It is preferable, though not essential, that the arrangement be such that the antenna 5 is tilted from its lowermost position upward at a uniform and comparatively slow rate, and then returned as rapidly as possible to its lowermost position. This "saw tooth" type of scanning in elevation may be provided by a suitable cam connection between the motor 17 and the antenna 5.

As an alternative to the described arrangement, the antenna 5 may be one of the several well-known types of so-called "rapid scanning" antennas, wherein motion of the beam is provided by moving a relatively small control element rather than by moving the antenna as a whole. In this case, the elevation scanning will be produced by motion of the control element and the azimuth scanning by rotation of the entire structure as described. It will be evident that the azimuth scanning may be made rapid and the elevation scanning relatively slow, if desired.

The screen of the cathode ray tube 13 is coated with a short persistence phosphor of the type which provides ultra violet or high actinic light, capable of exciting fluorescence in another phosphor. A second, relatively large screen 19, coated with a phosphor capable of being excited by light from the tube 13, is provided in front of the screen in tube 13. A disc or lamina 21 is supported for rotation behind and adjacent the screen 19. A condensing lens 23 is provided to project an image of the screen of the tube 13 upon the screen 19.

The scanning motors 15 and 17 are mechanically coupled to the disc 21 through a differential gear 25 in such manner that the speed of rotation of the disc 21 is the sum of the speeds of the motors 15 and 17.

The disc 21 is generally transparent and carries a number of opaque characteristic marks. In the embodiment shown in Figure 2 the numerals are arranged in more or less spiral groups, starting with zero and running up to six. The numerals represent various altitude layers, each of approximately 1,000 feet thickness. For example, zero may indicate the layer from zero to 500 feet altitude, 1 may indicate altitudes from 500 to 1500 feet, and so on.

In the operation of the system of Figure 1, pulses from the generator 9 are transmitted periodically by the transmitter 1 and the antenna 5. As the antenna scans the space surrounding the equipment, any reflecting object in the vicinity will intercept the beam and return some of the transmitted energy to the antenna. The returned pulses are received by the receiver 3 and applied to the cathode ray tube 13, momentarily increasing the intensity of the beam to provide a bright spot on the screen.

The position of the spot or "pip" depends upon the azimuth and range of the reflecting object, because the cathode ray beam is deflected radially by the saw tooth wave generator 11 in a direction corresponding to the azimuth of the antenna 5. Since the screen of the tube 13 has a short persistence characteristic, the pip will appear only when the elevation of the beam of the antenna 5 is the same as that of the reflecting objects. The disc 21 rotates, during each elevation scan of the antenna 5, one complete revolution plus the angle through which the antenna rotates in azimuth during that period. In the present example, the vertical sweep takes 1/60 second and one azimuth scan takes 3 seconds, so the disc 21 turns 1 1/60 revolution per vertical scan. If the reflected signal returns when the radar beam is at zero elevation, the light passes through the part of the disc marked with zero and the shadow of this mark is cast on the second screen 19. Similarly, if the radar beam is directed at an angle α with the respect to the horizontal, the mark corresponds to slant range times sine α, which is the altitude. In the illustration given, the marks corresponding to thousands of feet do not show steps of less than 1,000 feet.

The resulting display is shown in Figure 5 and is seen to be similar to the familiar PPI display, with the exception that the pips include numerals indicating the approximate altitudes of the respective targets. Thus, in Figure 5, the pip 27 represents an aircraft at a distance of about 13 miles, at a bearing of approximately 330° and an altitude of 8,000 feet. The pip 29 represents another craft at about 15 miles, bearing at 310° and an altitude of 3,000 feet.

It will be apparent that the numerals on the disc 21 may be made transparent rather than opaque, and embossed or otherwise formed to act as lens elements, thus providing illuminated images rather than shadows upon the screen 19. Characteristic marks other than numerals may be employed, if desired. The numerals or marks may be differently colored to facilitate objectivity of the display. In this case, the phosphor on the screen of tube 13 should provide white light, or at least mixed light containing the colors to be used. The screen 19 may then be merely ground glass or the like, not coated with phosphor. The markings on the disc 21 may be omitted entirely if desired and the various sectors of the disc simply made of characteristic colors. In this case, the various pips appearing on the second screen 19 will be distinguished by color alone.

Since the disc 21 in the embodiment of Figure 1 is required to rotate at a relatively high speed, it may be desirable to divide it into several similar sectors, for example, 4 as shown in Figure 3. The boundaries of the various characteristically marked areas are indicated by dash lines in Figure 3. Each of the sectors 31, 33, 35, and 37 is identical. The disc shown in Figure 3 may be substituted for the disc 21 in Figure 1 and rotated in ¼ the speed, (i.e. 905 r.p.m.).

A system similar to that described above can be used to show range on a radar display of the type providing an azimuth vs. elevation plot ("C" scan). Referring to Figure 4, a transparent drum 39 surrounds the cathode ray indicator tube 41 and rotates about a vertical axis as indicated by the arrow 43. The drum is provided with range marks corresponding generally in function to the altitude marks on the disc 21 in Figure 1. The speed of rotation of the drum 39 is made sufficiently high that it moves an appreciable distance in the time between echoes from near and far targets, and thus changes the number which is projected on the second screen according to the target range. The resulting display is similar to the so-called "C" scan presentation, except that the pips are characteristically marked or colored to indicate approximate range.

The invention has been described as an improvement in position indicator systems of the type used with radar and similar position determining the apparatus. The position of the object is indicated in prior art manner in two coordinates by a luminous spot or pip. According to the present invention, said pip is made of characteristic shape or color to indicate roughly the position of the object in the third coordinate. This is done by providing a second screen in front of the usual oscilloscope screen, with a mask or surface carrying characteristic marks or characteristically colored areas, moving between said screens at a uniform rate corresponding to the sum of the scanning rates in the third coordinate and in one of the first two coordinates. The light from a pip on the cathode ray screen passes through a certain portion of the marked surface depending upon the current position of the object in the third coordinate.

The invention may be applied to any of the several well-known types of visual presentations, such as the PPI scan, "C" scan or various others.

I claim as my invention:

1. In a radio system comprising a transmitter for cyclically scanning a zone of search with radio frequency energy to obtain the value of at least one parameter of the position of an object therein, for example, for cyclically scanning it in depth by periodically pulsing the energy or cyclically scanning it in an angular direction by directing the energy into a beam and periodically moving the beam, apparatus for representing said object and for coding the representation to indicate said value comprising: a cathode ray tube; means responsive to re-radiations from the object and effective during each scanning cycle for producing on the screen of the tube a luminous representation of the object, such as an impulse of light or a train of impulses of light, over a period of time which occurs, within said cycle, in timed relationship with it according to said value for that object; coding means, including a lamina which has an area positionable to intercept light rays from said screen and is adapted to transmit certain of them and selectively to block the others, for coding each luminous representation according to said value for the object which it represents; said lamina having distinctive combinations of light-transmitting and light-blocking characteristics for different portions of its said area for differently coding the visual representations of objects which are positioned in different sections of said zone predetermined according to different ranges of values for said parameter; means for driving said lamina in a predetermined direction with respect to an optical path from said screen and at a rate related to said cyclical scanning; and each of said portions of said area extending cross-wise to said direction in which the lamina is driven.

2. A radio system as in claim 1 in which: said transmitter cyclically scans the zone of search in at least two coordinates, such as in depth and one angular direction or in two angular directions, for obtaining the values of two parameters of the position of an object therein; said apparatus for representing an object and for coding the representation in accordance with a parameter-value obtained by one of the cyclical scannings is also adapted to position the representation on said screen in accordance with the parameter-value obtained by the other cyclical scanning and to this end further comprises means for varying the intensity of and for deflecting the cathode ray of said tube in synchronism with said other cyclical scanning to produce on said screen a scale which extends cross-wise to said direction in which the lamina is driven; said means responsive to re-radiations being further effective for producing said luminous representation at a position on said scale which represents the parameter-value obtained by said other cyclical scanning; and said portions of the area of said lamina are so disposed thereover that when the lamina is in any position a particular one of said portions will intercept light rays from a luminous representation produced at any point on said scale.

3. A radio system as in claim 1 in which said transmitter cyclically scans the zone of search in three coordinates, such as in depth by pulsing said energy and in two angular directions by moving said beam in two angular directions, for obtaining the values of three parameters of the position of an object therein; said apparatus for representing an object and for coding the representation in accordance with a parameter-value obtained by a first of the cyclical scannings is also adapted to position the representation on a scale on said screen in accordance with the parameter-value obtained by a second of the cyclical scannings and to position said scale on said screen in accordance with the parameter-value obtained by the third of said cyclical scannings and to this end said apparatus further comprises means for varying the intensity of and for deflecting the cathode ray of said tube in synchronism with said second cyclical scanning to produce on said screen a scale which extends cross-wise to said direction in which the lamina is driven and means for further deflecting said cathode ray to move the scale as a whole in said direction at a rate in accordance with said third cyclical scanning; said means responsive to re-radiations being further effective for producing said representation at a position on said scale which represents the parameter-value obtained by said second cyclical scanning while said scale is in a position on the screen in accordance with the parameter-value obtained by said third cyclical scanning;

said portions of the area of said lamina are so disposed thereover that when the lamina is in any position a particular one of said portions will intercept light rays from a luminous representation produced at any point on said scale; and said rate at which the lamina is driven in said direction is proportional to the sum of said first and third cyclical scannings.

4. In a radio frequency system comprising a transmitter for cyclically scanning a zone of search with radio frequency energy in three coordinates directions to obtain the values of a plurality of parameters of the position of an object therein, for example, for cyclically scanning it in depth by periodically pulsing the energy and cyclically scanning it in two coordinate angular directions by directing the energy into a beam and periodically moving the beam in said two directions, apparatus including a cathode ray tube for producing on the tube screen a luminous representation of the object at a position on a scale thereon in accordance with a first parameter-value obtained from a first of said cyclical scannings, for positioning the scale on the screen of the tube in accordance with a second parameter-value obtained from a second of said cyclical scannings, and for coding the representation in accordance with a fourth parameter-value derived as a function of said first value and a third parameter-value derived from the third cyclical scanning, for example, coding it in accordance with a value of altitude derived as a function of a value of slant range and a value of angle of elevation, comprising: means for varying the intensity of and for deflecting the cathode ray of said tube in synchronism with said first scanning to produce said scale; means for further deflecting the ray of said tube to move said scale as a whole on the screen of the tube in accordance with said second scanning; means responsive to re-radiations from the object to produce a luminous representation of the object at a position on the scale in accordance with said first parameter-value while said scale is in a position on the screen in accordance with said second parameter value; coding means, including a lamina which has an area positionable to intercept light rays from said screen and is adapted to transmit certain of them and selectively to block the others, for coding each luminous representation according to said fourth value; said lamina having distinctive combinations of light-transmitting and light-blocking characteristics for different predetermined portions of its area for differently coding the visual representations of objects which are positioned in different sections of said zone predetermined according to different ranges of fourth parameter values; means for driving said lamina in the same direction as the scale is moved on the screen and at a rate which is proportional to the sum of said second and third cyclical scannings; each of said portions of the area of said lamina extending in a direction thereover which is transverse both to said direction in which the said lamina is driven and to the direction of said scale on the screen.

References Cited in the file of this patent

UNITED STATES PATENTS

| | | |
|---|---|---|
| 2,304,081 | Goldmark | Dec. 8, 1942 |
| 2,323,905 | Goldmark | July 13, 1943 |
| 2,428,351 | Ayres | Oct. 7, 1947 |
| 2,426,979 | Ayres | Sept. 9, 1947 |
| 2,483,432 | Richardson | Oct. 4, 1949 |
| 2,468,714 | Leverenz | Apr. 26, 1949 |